US007882806B2

(12) United States Patent
Ver Hage et al.

(10) Patent No.: US 7,882,806 B2
(45) Date of Patent: Feb. 8, 2011

(54) CAGE WITH MICRO FILTER TOP

(76) Inventors: Richard P. Ver Hage, 112 Greenwood Ave., Midland Park, NJ (US) 07432; Glenn R. Ver Hage, 39 Hill St., Midland Park, NJ (US) 07432; Henry W. Ver Hage, 87 Chestnut St., Midland Park, NJ (US) 07432

( * ) Notice: Subject to any disclaimer, the term of this patent is extended or adjusted under 35 U.S.C. 154(b) by 63 days.

(21) Appl. No.: 12/472,541

(22) Filed: May 27, 2009

(65) Prior Publication Data
US 2010/0000473 A1 Jan. 7, 2010

Related U.S. Application Data

(60) Provisional application No. 61/130,183, filed on May 28, 2008.

(51) Int. Cl.
*A01K 1/03* (2006.01)
(52) U.S. Cl. ........................ 119/418; 119/500
(58) Field of Classification Search ............ 119/416, 119/417, 418, 452, 453, 454, 455, 456, 458, 119/472, 475, 482, 487, 489, 493, 496, 500, 119/512, 515, 419, 437, 498, 461, 474, 491; 206/508, 509, 503, 504, 511, 512; 220/4.26, 220/4.27, 23.6
See application file for complete search history.

(56) References Cited

U.S. PATENT DOCUMENTS

| 3,524,431 | A | * | 8/1970 | Graham et al. | 119/496 |
| 4,846,109 | A | * | 7/1989 | Baer et al. | 119/496 |
| 5,174,241 | A | * | 12/1992 | Goguen et al. | 119/496 |
| 5,332,114 | A | * | 7/1994 | Sano et al. | 220/4.24 |
| 5,452,681 | A | * | 9/1995 | Ho | 119/498 |
| 5,572,953 | A | * | 11/1996 | Phelan et al. | 119/496 |
| 5,697,500 | A | * | 12/1997 | Walker | 206/509 |
| 7,584,720 | B1 | * | 9/2009 | Jackson | 119/472 |
| 2001/0054394 | A1 | * | 12/2001 | Marchioro | 119/452 |
| 2005/0028751 | A1 | * | 2/2005 | Strzempko et al. | 119/496 |
| 2006/0185614 | A1 | * | 8/2006 | Van Fleet, Jr. | 119/496 |
| 2007/0227460 | A1 | * | 10/2007 | Lynch | 119/455 |

* cited by examiner

*Primary Examiner*—T. Nguyen
(74) *Attorney, Agent, or Firm*—Sofer & Haroun, LLP

(57) ABSTRACT

A cage and cage cover combination includes at least a cage cover having a plurality of stacking lugs. The combination also includes at least an animal cage having a lower surface, where the upper surfaces of the stacking lugs, when in contact with the lower surface of an animal cage form a substantially even connection such that a cage stacked on top of a cover rests securely on the cage cover.

6 Claims, 4 Drawing Sheets

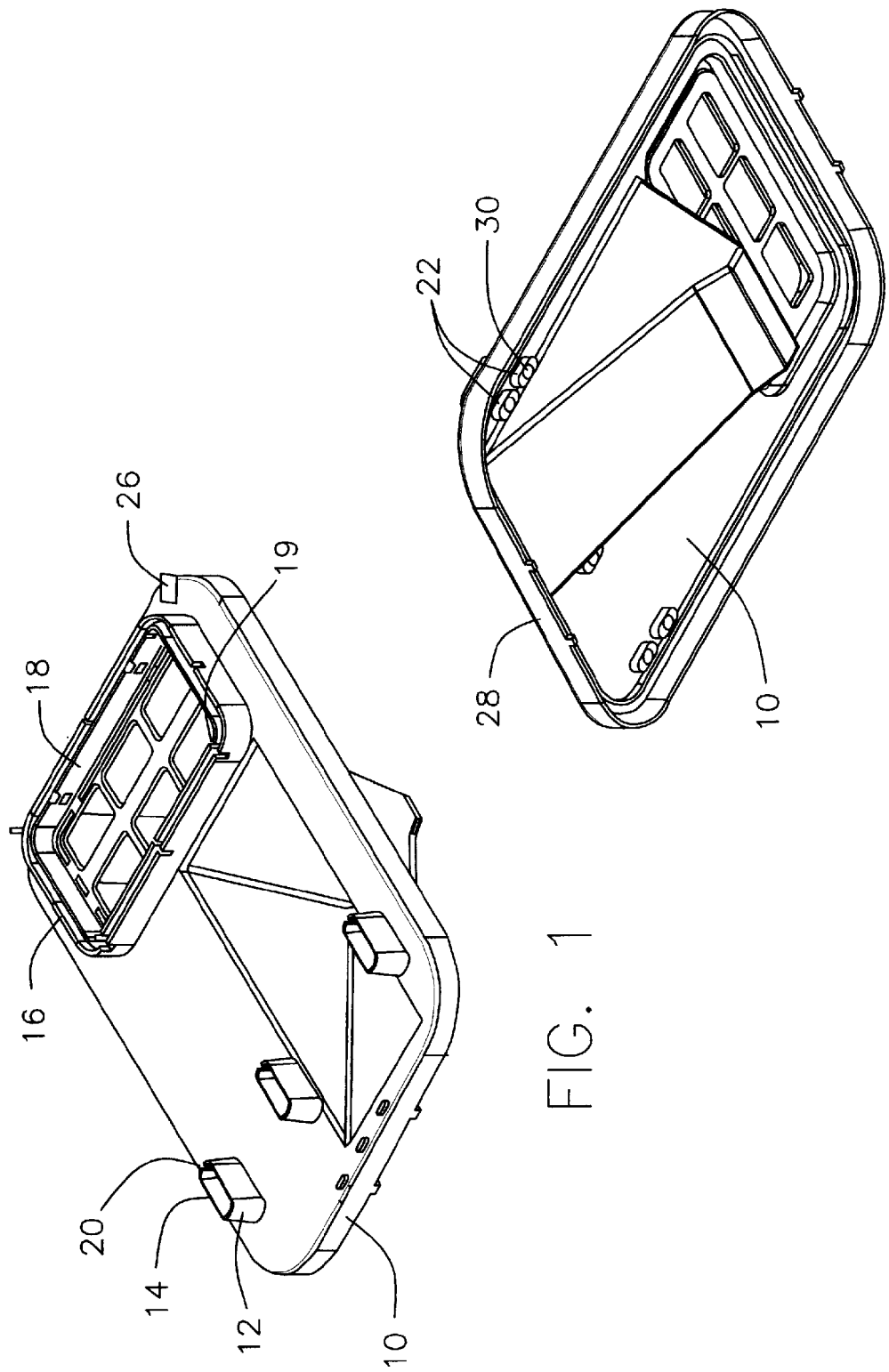

SECTION B-B

SECTION A-A

SECTION D-D

SECTION C-C

CAGE WITH MICRO FILTER TOP

RELATED APPLICATION

This application claims the benefit of priority from U.S. Provisional Patent Application No. 61/130,183, filed on May 28, 2008, the entirety of which is incorporated by reference.

BACKGROUND

1. Field of the Invention

This application relates to animal cages and animal cage covers. More particularly, this application relates to animal cages and animal cage covers for improved stacking.

2. Background

In the area of animal cages and animal cage covers, such as transparent polymer animal cages, frequent cleaning of the cages is required. The cages need to be washed thoroughly to avoid possible experiment contamination, while simultaneously being washed in high volume.

The animal cage cover, such as a micro filter top, when it is stored, washed or moved as a group, needs to stack without falling over, must stack straight on top of one another and must stack many layers high. Also, when washed, the covers are laid on a conveyor belt, which has many holes in it and the micro filter top can not have pieces that will protrude into those holes.

Additionally, once the cages and covers have been cleaned, they need to be stacked for transport. Also, during preparation of the cages, the cages with covers, may be arranged in stacks in a nearby staging area by a rack system. While stacked outside the rack, possibly partially filled with food or even animals, the cage and cage cover assemblies must not slide or fall off of one another.

OBJECT AND SUMMARY

The animal cage and animal cage cover of the present application provides an improved cover that allows for efficient stacking for cleaning purposes. Also, the combined cage cover and cage assembly is simultaneously independently stackable in a solid arrangement.

In one arrangement, the animal cage cover, when it is stored, washed or moved as a group, stacks without falling over, stacks straight on top of one another, and stacks many layers high. It is furthermore configured so that it can be laid on a conveyor belt, which has many holes, without having any pieces that protrude into those holes.

To this end, a cage and cage cover combination has a cage cover having a plurality of stacking lugs and an animal cage having a lower surface. The upper surfaces of said stacking lugs, when in contact with the lower surface of an animal cage form a substantially even connection such that a cage stacked on top of a cover rests securely on the cage cover.

BRIEF DESCRIPTION OF THE DRAWING

The present invention can be best understood through the following description and accompanying drawings, wherein:

FIG. 1 illustrates a perspective view of an animal cage cover, according to one embodiment;

FIG. 2 illustrates a bottom perspective view of an animal cage cover, according to one embodiment;

DETAILED DESCRIPTION

Figure 3C:
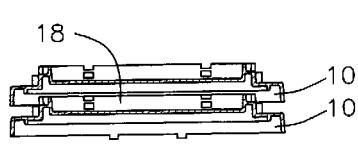
FIG. 3C illustrates the two stacked animal cage covers from FIG. 3A along the section B-B, according to one embodiment.
Figure 3B:
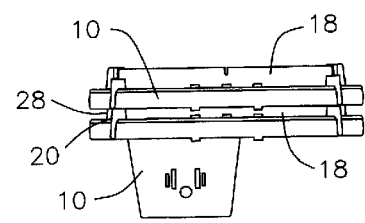
FIG. 3B illustrates the two stacked animal cage covers from FIG. 3A along the section A-A, according to one embodiment.

In one embodiment, as shown in FIGS. 1 and 2, an animal cage cover 10, such as a micro-filter top, is shown. Animal cage cover 10 is typically constructed as a clear polymer cover, however, it is not limited in this respect.

As shown in FIG. 1, animal cage cover 10 has a plurality of stacking lugs 12. The width and length of stacking lugs 12 are made so that they do not fall within the openings on standard conveyor belts of the equipment used to wash micro filter tops. Typical conveyor belts have 1"×1" openings within a wire mesh conveyor belt. As such, stacking lugs 12 are typically dimensioned with at least one measurement substantially longer than 1".

The height of stacking lugs 12 are made so that an upper surface 14 of lug 12 is substantially the same height as upper vent surface 16 of cage cover vent 18. Many animal cage covers 10 maintain a vent 18 dimensioned to allow sufficient air flow within the animal cage. This vent 18 has a raised surface 16 for supporting micro-filter items. However, vent 18, raised from the general surface of cover 10 causes it to have an un-even surface.

It is noted that cover 10 may be configured alternatively without a vent 18. In such an instance the area of vent 18 would be flat, possibly with several raised receivers 19 for mating with rails 52 as described in detail below. For the purposes of illustration, cage cover 10 is described throughout as having a vent 18.

In the present arrangement, both lug surface 14 and vent surface 16 are substantially the same height, so when cover 10 is laid down on its top side, it lays down flat and parallel to the surface it is laid on. Thereafter, when multiple covers 10 are stacked on top of one another, the stack of cage covers 10 remains straight and stable for storage and transport.

Stacking lugs 12 are preferably constructed as hollow oval rings to make injection molding it easier and faster.

In one arrangement as shown in FIG. 1, a slot 20 is dimensioned to run from lug surface 14 down to its base. Slot 20 is used so that in cleaning, any water that may accumulate in that space has a channel to flow out and the space would not become a reservoir for holding water which could lead to post wash unsanitary conditions.

In another embodiment, as shown in FIG. 2, animal cage cover 10, on its underside surface has a plurality of mating lugs 22 and centering lugs 30. In one arrangement, stacking lugs 12 and mating lugs 22 provide for the proper height between two (or more) animal cage covers 10 on this end of the micro filter vent 18.

As shown in FIGS. 3A-3E, when stacking animal cage covers 10, stacking lugs 12 on the upper surface of cage cover 10 sits against corresponding mating lugs 22 on the surface of those lugs 22. As shown in FIGS. 3A-3D, the combination of the height of stacking lugs 12 and mating lugs 22 substantially match up to the height of separate stacking tab 26 of one cover 10 and the top lower edge 28 of a separate cover 10.

Figure 3A:
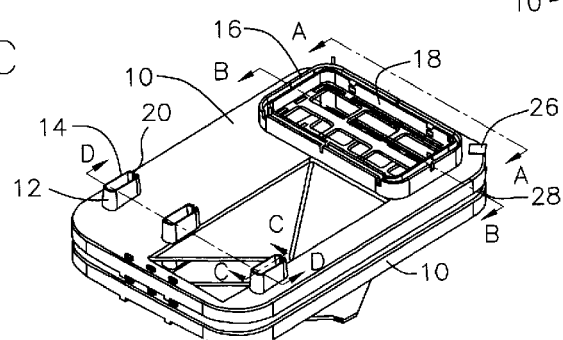
FIG. 3A illustrates a perspective view of two stacked animal cage covers from FIG. 1, according to one embodiment.
Figure 3D:
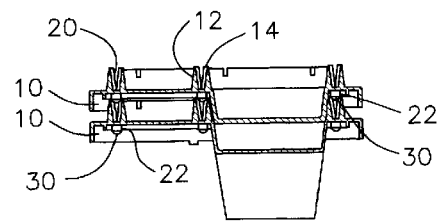
FIG. 3D illustrates the two stacked animal cage covers from FIG. 3A along the section D-D, according to one embodiment.
Figure 3E:
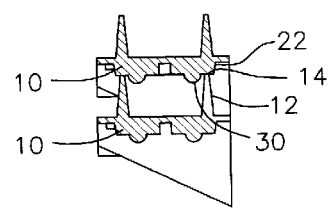
FIG. 3E illustrates the two stacked animal cage covers from FIG. 3A along the section C-C, according to one embodiment.

These separate stacking tabs 26, in relation to lower edges 28 of a separate covers 10 provide the proper stacking height on that end of covers 10. Thus, the combination of lugs 12/22 in addition to tabs 26/edges 28, provides a parallel stacking height between multiple covers 10 when they are stacked one on top of another as shown in FIG. 3A.

In another arrangement, each stacking lug 12 includes a centering lug 30 that protrudes down into the inside space of stacking lug 12 and provides interference if stacking lug 12 were to slide front to back or left to right. See for example FIG. 3E. The shape of the cage covers 10 are stacked one on top of another. They are easily self-centering and have enough clearance so that they do not stick together, which would make it hard to pull them apart.

Figure 4:
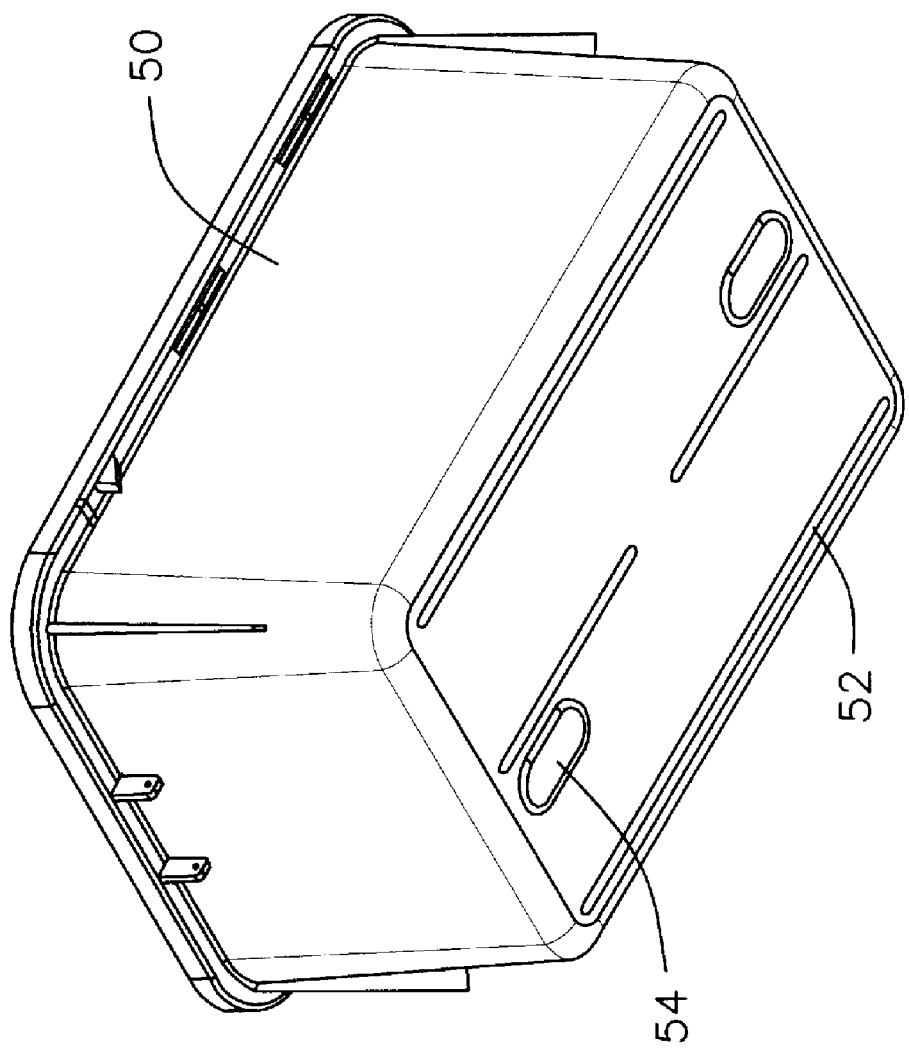
FIG. 4 illustrates a bottom perspective view of an animal cage, according to one embodiment.

In another embodiment, as shown in FIG. 4, an animal cage 50 is shown having both bottom rails 52 for sliding into and out of cage assemblies, and locating rings 54.

As noted above, in use, many times the cage assemblies (cage 50 and cover 10) are pulled off of a rack or shelf and are stacked one above another as an assembled unit. Then cages 50 and covers 10 are either stored on a table awaiting use or put onto carts and moved to different rooms. In either case, once they are stacked they cannot slide. In some instances there may be animals inside these cages 50 and if they slide and fall, the animals may get loose or hurt or there could be contaminated bedding, which would fall out and contaminate work surfaces, people and animals. The present invention improves that stability.

The arrangement of locating ring 54 molded on the bottom of cage 50 is such that cage 50 can be positioned from either direction with locating rings 54 matching to corresponding stacking lug 12 on covers 10 from the cage 50 located below.

Figure 5:
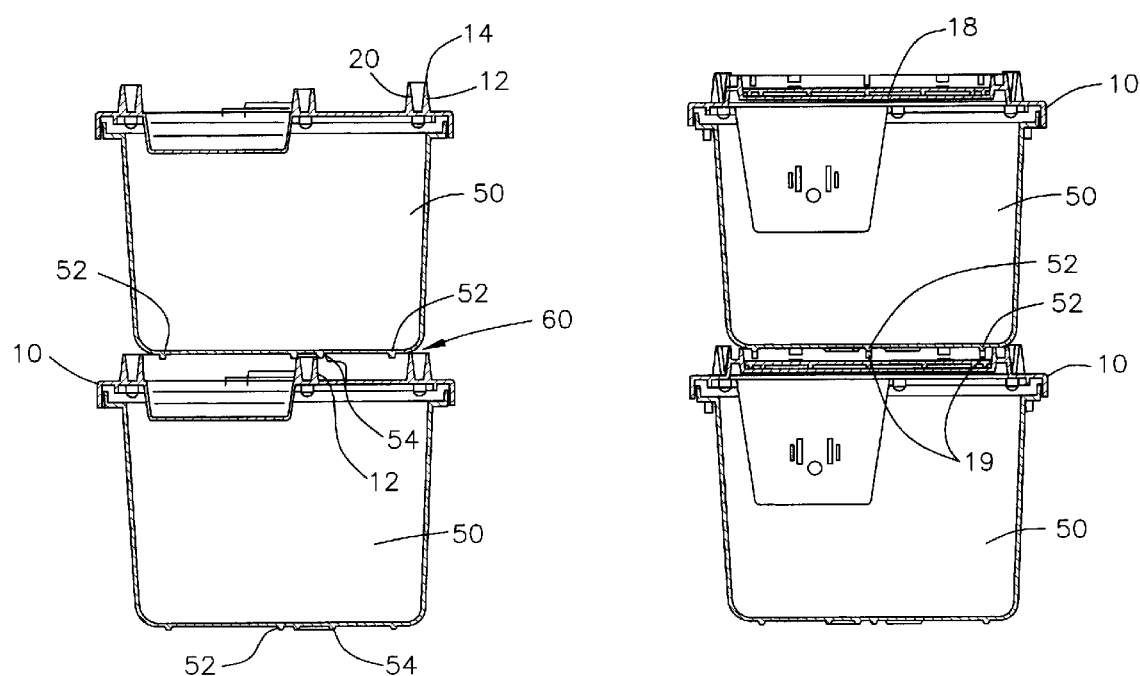
FIG. 5 illustrates a plurality of stacked animal cages and animal cage covers, according to one embodiment.

For example, as shown in FIG. 5, locating ring 54 matches up with the center-stacking lug 12 on cover 10. As cage 50 sits on top of cover 10 from cage 50 below, locating ring 54 goes around stacking lug 12 and holds it in that position from moving front to back or left and right. The design of the locating ring 54 is made so that it smoothly sits down on that stacking lug 12 and so that it is easily pulled off of it.

In addition to locating ring 54 corresponding in location to a center stacking lug 12, the side stacking lugs 12 also match up to the edges of the bottom of cage 50. For example, the two side stacking lugs 12, as shown in FIGS. 1 and 2, are designed to match up with the corners of the cage 50 bottom, as shown in FIG. 5, at location 60. The two side stacking lugs 12 come up slightly above the bottom of cage 50 on its corners.

In one embodiment, stacking lug 12 located in the center is slightly shorter than the two outside lugs 12, so that the outside corners of cage 50 from a cage 50 located above, contacts the corner radius of that cage 50.

In this arrangement, the three stacking lugs 12 work together, with the center lug 12 height setting the cage assembly stacking height at its location in the front of cage 50 to match the stacking height at the back of the cage at surface 16 of vent 18. The two outside stacking lugs 12 heights and positions are such that to contact the cage 50 bottom radii at the same time center lug 12 contacts the cage 50 bottom surface at locating ring 54. The two outside stacking lugs 50 come in contact with the bottom radii of cage 50 at a location above the radii tangent point radii on the bottom surface of cage 50. Such an arrangement helps keep the side-to-side stacking stability better.

It is noted that maintaining three stacking lugs 12 in a row and at substantially the same height relative to one another is hard to do with plastics and different shrinking rates during manufacture. In the present arrangement, by keeping the center stacking lug 12 slightly lower the processing of cage cover 10 is made easier.

In another embodiment as shown in FIGS. 2 and 5, bottom rails 52 of cage 50 are configured to slide-fit within three receivers 19, on animal cage covers 10 on the side opposite stacking lugs 12, near surface 16 of vent 18. As the cage assemblies (10/50) are stacked one above another, the rails 52 of the bottom of cage 50 mate with receivers 19, preferably in two or three (as illustrated) separate sections across the width of cage cover 10 in order to provide more stacking stability.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cage and cage cover combination, said combination comprising:
 a cage cover having a plurality of stacking lugs on its upper surface; a plurality of mating lugs on its lower surface for receiving stacking lugs, when such covers are stacked for cleaning; and a plurality of centering lugs, disposed within said stacking lugs to prevent a first cage cover stacked on second cage cover from sliding;
 said combination also comprising:
 an animal cage having a lower surface, wherein the upper surfaces of said stacking lugs contacts said lower surface of an animal cage forming a substantially even connection such that a cage stacked on top of a cover rests securely on said cage cover.

2. The cage and cage cover as claimed in claim 1, wherein said cage cover includes a vent, wherein the upper surfaces of said stacking lugs and said vent contacts said lower surface of an animal cage forming a substantially even connection such that a cage stacked on top of a cover rests securely on said cage cover.

3. The cage and cage cover as claimed in claim 1, wherein said stacking lugs have a slot 20 configured to prevent water from accumulating in said cover during cleaning.

4. The cage and cage cover as claimed in claim 1, wherein said cage cover includes a plurality of stacking tabs configured to align with a top lower edge of a second cage cover stacked on top of a first cage cover.

5. The cage and cage cover as claimed in claim 2, wherein said lower surface of said cage has at least one locating ring corresponding to a cage cover from a lower disposed cage, so that when a first cage is disposed on top of a second cage and cage cover, the locating ring of the first cage engages said stacking lug of said second cage cover.

6. The cage and cage cover as claimed in claim 5, wherein said stacking lugs together with a centrally located lug have heights configured to set said cage stacking height at its location in the front of said cage cover to match the stacking height at the back of said cage cover near said vent.

* * * * *